(12) United States Patent
Agarwal et al.

(10) Patent No.: US 7,123,835 B2
(45) Date of Patent: Oct. 17, 2006

(54) METHOD AND SYSTEM FOR INCREASING THE CAPACITY AND SPECTRAL EFFICIENCY OF OPTICAL TRANSMISSION

(75) Inventors: Anjali Agarwal, Hazlet, NJ (US);
Sonali Banerjee, Morganville, NJ (US);
Diego F. Grosz, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 655 days.

(21) Appl. No.: 10/351,948

(22) Filed: Jan. 27, 2003

(65) Prior Publication Data
US 2004/0146297 A1    Jul. 29, 2004

(51) Int. Cl.
*H04J 14/00* (2006.01)

(52) U.S. Cl. ............... 398/43; 398/65; 398/48; 398/193; 398/208

(58) Field of Classification Search ........... 398/158, 398/65, 43, 48, 193, 208
See application file for complete search history.

(56) References Cited

U.S. PATENT DOCUMENTS

| | | | |
|---|---|---|---|
| 5,526,162 A * | 6/1996 | Bergano | 398/185 |
| 6,169,626 B1 * | 1/2001 | Chen et al. | 359/279 |
| 6,373,604 B1 * | 4/2002 | Xie | 398/79 |
| 6,574,396 B1 * | 6/2003 | Dragone | 385/37 |
| 6,671,079 B1 * | 12/2003 | Fuller et al. | 359/264 |
| 6,961,522 B1 * | 11/2005 | Castagnetti et al. | 398/92 |

OTHER PUBLICATIONS

Bosco, G. et al. "On the Use of NRZ, RZ, and CSRZ Modulation at 40 Gb/s With Narrow DWDM Channel Spacing." IEEE, Journal of Lightwave Technology. vol. 20, No. 9. Sep. 2002. p. 1694-1704.*
Zhu, B. et al. "1.6 Tbit/s (40x42.7 Gbit/s) WDM transmission over 2400 km of fibre with 100 km dispersion-managed spans." IEEE, Eelectronics Letters. vol. 38, No. 13. Jun. 20, 2002. p. 647-648.*
Ooi, Hiroki et al. "40 Gb/s WDM Transmission with Virtually Imaged Phased Array (VIPA) Variable Dispersion Compensators." IEEE, Journal of Lightwave Technology. vol. 20, No. 12. Dec. 2002. p. 2196-2203.*
Rebola et al. "Power Penalty Assessment in Optically Preamplified Receivers With Arbitrary Optical filtering and Signal-Dependent Noise Dominance." IEEE, Journal of Lightwave Technology. vol. 20, No. 3. Mar. 2002. p. 401-408.*

* cited by examiner

*Primary Examiner*—David C. Payne

(57) ABSTRACT

A method and system for increasing the capacity and spectral efficiency of optical transmission includes pre-filtering optical pulses utilizing a bandwidth substantially proportional to the bit rate of the transmission system prior to propagating the optical pulses along a transmission fiber and post-filtering the propagated optical pulses utilizing a bandwidth substantially proportional to the bit rate of the transmission system.

18 Claims, 5 Drawing Sheets

METHOD AND SYSTEM FOR INCREASING THE CAPACITY AND SPECTRAL EFFICIENCY OF OPTICAL TRANSMISSION

FIELD OF THE INVENTION

This invention relates to the field of optical transmission systems and, more specifically, to the spectral efficiency of optical transmission systems.

BACKGROUND OF THE INVENTION

Dense Wavelength Division Multiplexed (DWDM) optical transmission systems have been widely deployed in optical networks to increase network speed and capacity. A conventional DWDM optical transmission system comprises a plurality of optical transmitters configured to transmit respective channels of information at different wavelengths, an optical multiplexer configured to combine the respective channels into a multi-wavelength optical signal for transmission on a single transmission fiber, a plurality of serially connected optical amplifiers configured as repeaters to amplify the multi-wavelength optical signal at intervals along a transmission path, an optical de-multiplexer configured to separate the multi-wavelength optical signal into its component channels, and a plurality of optical receivers configured to receive and detect the information carried by the respective channels.

Various approaches have been proposed and investigated for increasing the capacity of optical transmission systems. One approach for increasing the capacity of optical transmission systems includes transmitting optical channels along a transmission system with orthogonal polarizations. A shortcoming associated with this approach is that, because of the many sources of polarization distortions associated with transmitting an optical signal along a transmission system, such as polarization mode dispersion (PMD), receiving and detecting the information carried by the respective channels after transmission becomes extremely difficult. As such, more complex (expensive) receiving techniques need to be implemented in such systems.

Another approach for increasing the capacity of optical transmission systems includes increasing the bit rates per channel of an optical transmission system. With this approach, faster electronics are required to produce and detect the optical pulses, which in turn increases the cost of the transmission system. Furthermore, increasing the bit rates per channel can lead to higher bit error rates, and eventually, to a bit rate beyond the capability of currently available electronics.

SUMMARY OF THE INVENTION

The present invention provides a method and system for increasing the capacity and the spectral efficiency of optical transmission systems.

In one embodiment of the present invention, a method for increasing the capacity and spectral efficiency of optical transmission includes pre-filtering optical pulses utilizing a bandwidth substantially proportional to the bit rate of the transmission system prior to propagating the optical pulses along a transmission fiber and post-filtering the propagated optical pulses utilizing a bandwidth substantially proportional to the bit rate of the transmission system.

In another embodiment of the present invention, an optical transmission system includes at least one light source, for providing light at a plurality of wavelengths, at least one transmitter, for generating optical pulses from the plurality of light sources, at least one first filter, for pre-filtering the optical pulses utilizing a narrow bandwidth substantially proportional to the bit rate of the transmission system prior to propagating the optical pulses along a transmission fiber, at least one second filter, for post-filtering the optical pulses utilizing a narrow bandwidth substantially proportional to the bit rate of the transmission system after propagation of the optical pulses along the transmission fiber and a receiver, for receiving the filtered optical pulses.

BRIEF DESCRIPTION OF THE DRAWINGS

The teachings of the present invention can be readily understood by considering the following detailed description in conjunction with the accompanying drawings, in which:

FIG. 3c graphically depicts a magnified portion of the spectrum of the input optical signal of FIG. 3a;

To facilitate understanding, identical reference numerals have been used, where possible, to designate identical elements that are common to the figures.

DETAILED DESCRIPTION OF THE INVENTION

The present invention advantageously provides a method and system for increasing the transmission capacity of optical transmission systems. Although embodiments of the present invention will be described with respect to a dense wavelength division multiplexed (DWDM) optical transmission system utilizing carrier-suppressed return-to-zero (CS-RZ) optical signals, it will be appreciated by those skilled in the art that the teachings of the present invention can be advantageously implemented in other optical transmission systems utilizing other transmission formats in which it is desirable to increase the capacity and/or spectral efficiency of optical transmission.

Figure 1:
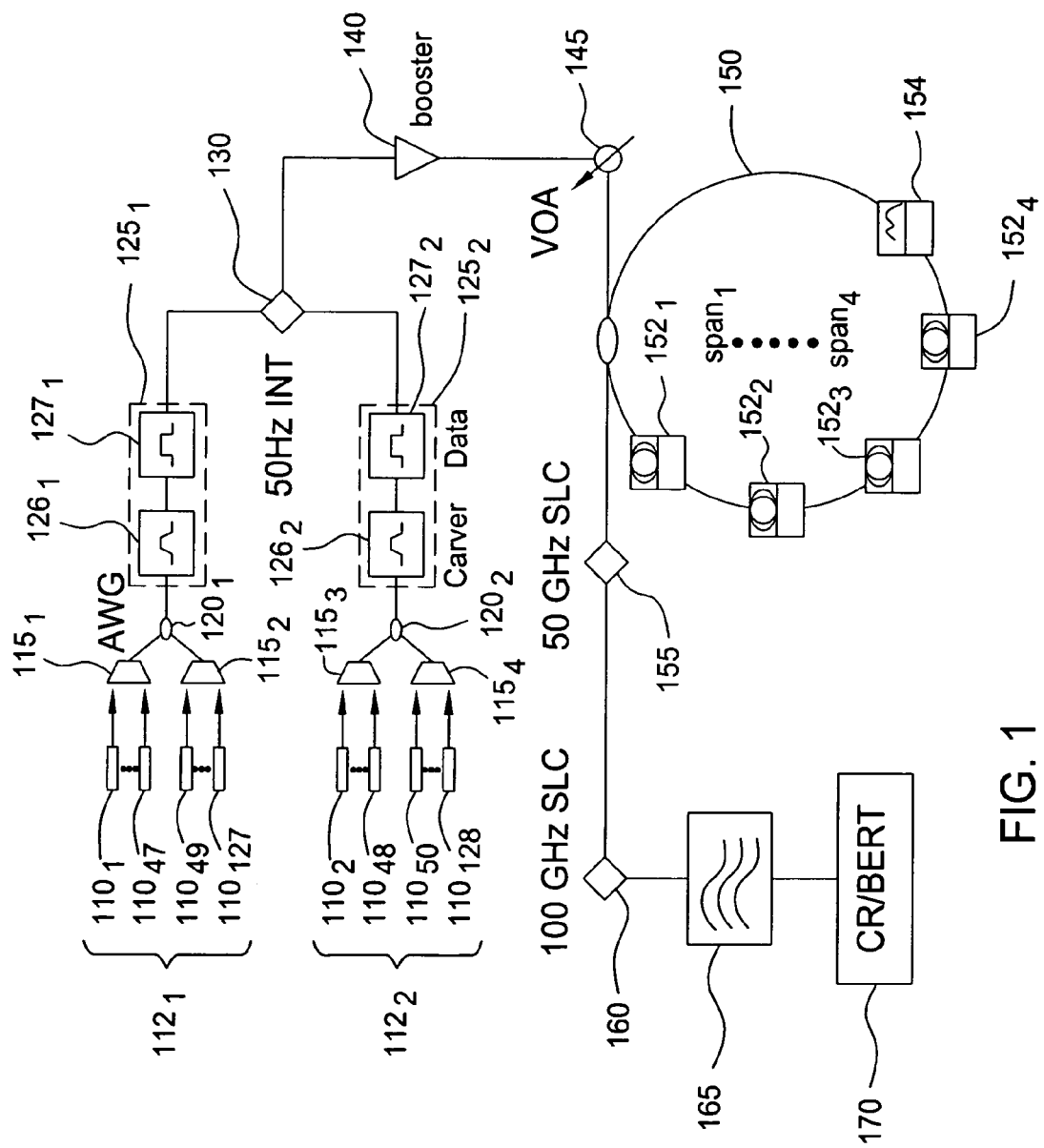
FIG. 1 depicts a block diagram of an optical transmission system including an embodiment of the present invention.

FIG. 1 depicts a block diagram of an optical transmission system 100 including an embodiment of the present invention. The optical transmission system 100 is configured for all-Raman single wide-band (53 nm) long-haul transmission of 5.12 Tb/s (128×42.7 Gb/s) over 1280 km of commercially available standard single mode fiber (SSMF). Although the optical transmission system 100 of FIG. 1 is depicted as an all-Raman single wide-band transmission system, the concepts of the present invention can be applied to other optical transmission systems employing various numbers of Raman pumps of varying rates and lengths. In optical transmission systems, the achievable capacity for a given transmission band is determined by the spectral efficiency, defined as the channel bit rate divided by the channel separation. As such, the inventors herein demonstrate a record capacity of 655 Pb/s×km at 0.8 bits/s/Hz spectral efficiency over SSMF.

The optical transmission system 100 of FIG. 1 includes a plurality of light sources (illustratively 128 signal lasers spaced by 50 GHZ) $110_1$–$110_{128}$ (collectively light sources 110), four multiplexers (illustratively four arrayed waveguide grating routers (AWGs)) $115_1$–$115_4$ (collectively AWGs 115), two couplers (illustratively two 3 dB couplers) $120_1$, $120_2$, two data transmitters (illustratively two 67% carrier-suppressed return-to-zero (CS-RZ) pulse-carvers transmitting pseudo-random bit sequences $2^{31}$–1 bits long) $125_1$, $125_2$, an interleaver (illustratively a 50 GHz interleaver) 130, a booster amplifier 140, a variable optical attenuator (VOA) 145, a recirculating loop 150, a demultiplexer (illustratively a 50 GHz slicer) 155, a 100 GHz slicer 160, a bandpass filter (illustratively a tunable 1.1 nm bandpass filter) 165, and a receiver (illustratively a clock recovery/BER measurement terminal (CR/BERT)) 170. The recirculating loop 150 comprises four 80 km spans of standard single-mode fiber (SSMF) $152_1$–$152_4$ (collectively spans 152), and a gain equalizing filter (GEF) 154 following the last fiber span $152_4$.

In the optical transmission system 100 of FIG. 1, the 128 signal lasers 110 are spectrally spaced by 50 GHz and grouped into two banks $112_1$, $112_2$ of 64 channels each. Illustratively in FIG. 1, the odd numbered signal lasers are separated into the first bank $112_1$ and the even numbered signal lasers are separated into the second bank $112_2$. The 64 channels of each bank $112_1$, $112_2$ are multiplexed using two AWGs 115. Illustratively, the first bank $112_1$ is multiplexed using AWGs $115_1$ and $115_2$ and the second bank $112_2$ is multiplexed using AWGs $115_3$ and $115_4$. The outputs of AWGs $115_1$ and $115_2$ are joined at coupler $120_1$ for transmission along a first optical path, and the outputs of AWGs $115_3$ and $115_4$ are joined at coupler $120_2$ for transmission along a second optical path. Each bank $112_1$, $112_2$ in each of the optical paths is independently modulated with $2^{31}$–1 pseudo-random bit sequence (PRBS) data. The modulation format of 67% CS-RZ is obtained by pulse carving. The pulse carving is achieved in the first optical path with the first data transmitter $125_1$ comprising a first carver modulator $126_1$ followed by a first data modulator $127_1$ and in the second optical path with the second data transmitter $125_2$ comprising a second carver modulator $126_2$ followed by a second data modulator $127_2$. The data modulators $127_1$, $127_2$ are driven with electrical non-return to zero (NRZ) signals at the rate of 42.7 Gb/s. It should be noted that although other transmission formats can be used with the concepts of the present invention, the CS-RZ format is preferred because when CS-RZ is strongly filtered (narrowly filtered), the pulses retain their shape. These pulses reduce the non-linear effects of propagation within a transmission fiber. Other transmission formats (e.g., NRZ and return-to-zero (RZ)), when strongly filtered, lose their pulse shapes and the data propagated with these transmission formats is more affected by the non-linear effects of propagation because the filtered pulses become square and overlap. So, although the NRZ transmission format is narrower than the CSRZ transmission format, the CSRZ transmission format is preferred for highly spectral efficient transmission because the pulses maintain their shape after strong filtering. Also, strongly filtered CS-RZ pulses are easier to detect with narrow bandwidth high-speed receivers as compared to strongly filtered NRZ or RZ pulses that become square-shaped under strong optical filtering.

The two banks of channels $112_1$, $112_2$ are orthogonally polarized and coupled together by the interleaver 130. The interleaver 130 of FIG. 1 is, illustratively, a narrow interleaver with a 50 GHz passband at the 3 dB point. The interleaver 130 provides a strong pre-filtering of the 128 optical channels received. The bandwidth of the pre-filter is chosen to be substantially similar to the bit rate of the optical transmission system. For example, the bit rate of the optical transmission system 100 is 42.7 Gb/s and the bandwidth of the interleaver 130 is chosen to be 50 GHz. The strong pre-filtering is necessary because the channels are so closely spaced. This strong pre-filtering by the interleaver 130 prevents the channels from overlapping during transmission along the fiber. A 50 GHz interleaver is a component typically associated with transmission systems having a 10 Gb/s bit rate.

The optical channels processed by the interleaver 130 are boosted to a per-channel launch power of –4 dBm by the booster amplifier 140. The boosted optical channels then propagate through the VOA 145 to ensure the channel power in the fiber and through the recirculating loop 150 (e.g., in this embodiment, the channel power is set to –4 dBm).

Figure 2:
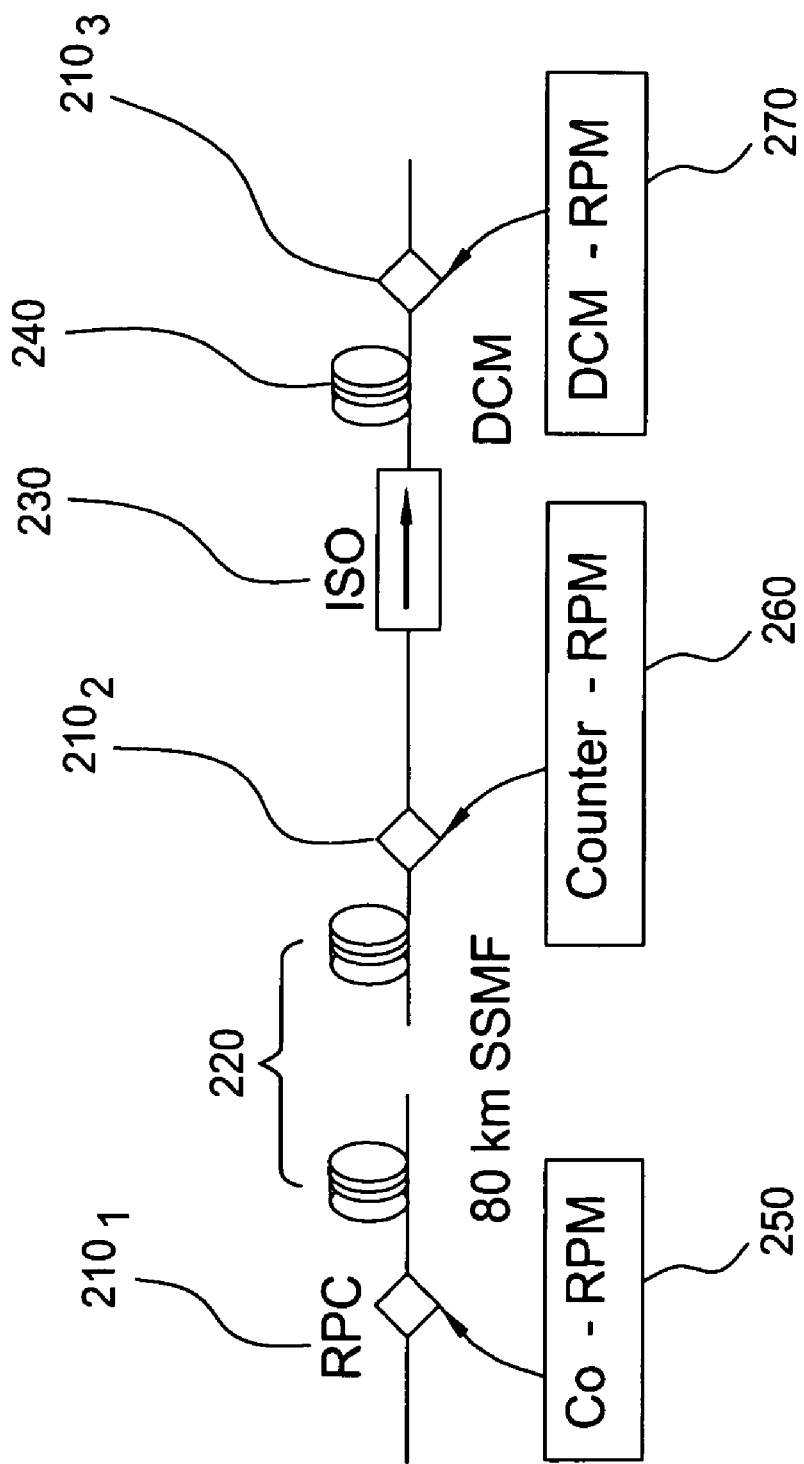
FIG. 2 depicts a high level block diagram of an 80 km standard single-mode fiber span of FIG. 1.

FIG. 2 depicts a high level block diagram of one of the 80 km SSMF spans 152 of the recirculating loop 150 of FIG. 1. Because the four 80 km SSMF spans 152 are substantially identical, FIG. 2 is representative of each of the four 80 km SSMF spans 152. The 80 km SSMF span of FIG. 2 comprises three Raman pump combiners $210_1$–$210_3$, 80 km of SSMF 220, an optical isolator (ISO) 230, a dispersion compensating module (DCM) 240, forward pumping Raman pump module (RPM) 250, a counter pumping Raman pump module (RPM) 260, and a DCM pump module 270.

Each of the four spans $152_1$–$152_4$ of the recirculating loop 150 has approximately 17 dB loss and are both forward and counter-pumped as depicted in FIG. 2. The total on-off Raman gain is ~16 dB, with 4 dB co-gain. Using this pumping scheme, a flat gain spectrum is achieved (within ~0.9 dB per span) from 1554 nm to 1607 nm (i.e., a single 53 nm extended L-band). To overcome the remaining span losses, each DCM 240 following the transmission fiber is counter-pumped and the corresponding on-off gain is approximately 12 dB. In-line DCMs are implemented to provide the desired level of undercompensation of approximately +30 ps/nm per span. Postcompensation is provided by a tunable compensator that brings the net dispersion of the channel under test close to 0 ps/nm at the end of the line.

The Gain Equalization Filter (GEF) 154 follows the last fiber span $152_4$ in the recirculating loop 150, yielding a spectral ripple of 5 dB after transmission of 1280 km.

Referring back to FIG. 1, the optical channels are then demultiplexed. The demultiplexer 155 of FIG. 1 is illustratively a 50 GHz slicer having a 41 GHz passband at the 3 dB point. The 41 GHz passband of the 50 GHz slicer 155 provides strong post-filtering and rejection of neighboring channels. As in the case of the interleaver 130 described above, the bandwidth of the post-filter is chosen to be substantially similar to the bit rate of the optical transmission system. Again, like the interleaver 130 used for pre-filtering, the strong post-filtering is necessary because the channels are so closely spaced. The 50 GHz slicer is also a component typically associated with transmission systems having a 10 Gb/s bit rate.

The 50 GHz slicer 155 is followed by the 100 GHz slicer 160 having a 75 GHz passband at the 3 dB point, and the tunable 1.1 nm bandpass filter 165. The 50 GHz slicer 155 and the 100 GHz slicer 160 provide strong post-filtering in accordance with the concepts of the present invention.

Figure 3A:
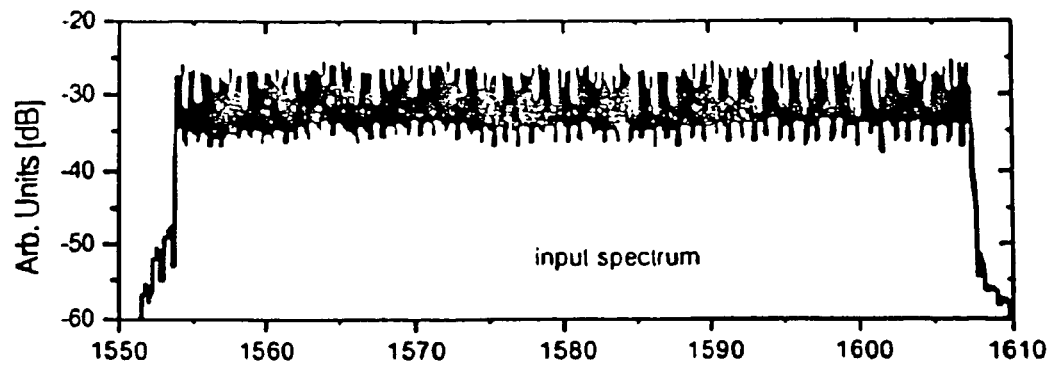
FIG. 3a graphically depicts the spectrum of an optical signal input to the recirculating loop after being filtered in accordance with the embodiment of the present invention of FIG. 1.
Figure 3B:
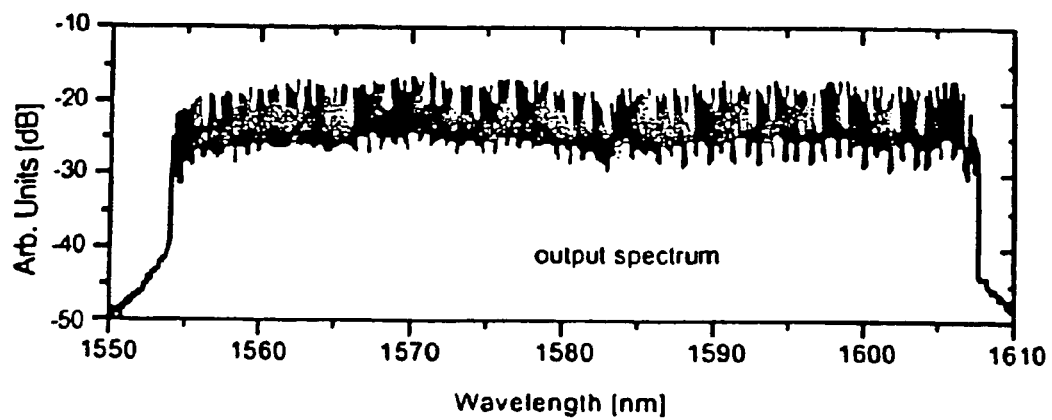
FIG. 3b graphically depicts the spectrum of the optical signal of FIG. 3a after transmission of 1280 km.

The demultiplexed data is communicated to the CR/BERT 170. The CR/BERT 170 then recovers the clock from the received demultiplexed data. The data is electrically demultiplexed in four 10 Gb/s data streams (called tributaries) and then the average BER of the four 10 Gb/s tributaries is measured. The bandwidth of the CR/BERT 170 is typically less than sixty percent (60%) of the bit rate of the transmission system for 40 Gb/s transmission. FIG. 3a graphically depicts the spectrum of an optical signal input to the recirculating loop 150 after being filtered in accordance with the embodiment of the present invention of FIG. 1. FIG. 3b graphically depicts the spectrum of the optical signal of FIG. 3a after transmission of 1280 km (4 turns around the recirculating loop 150). As evident from a comparison of FIG. 3a to FIG. 3b, the pre-filtering of the present invention substantially prevents the plurality of propagating optical channels from overlapping.

Figure 3C:
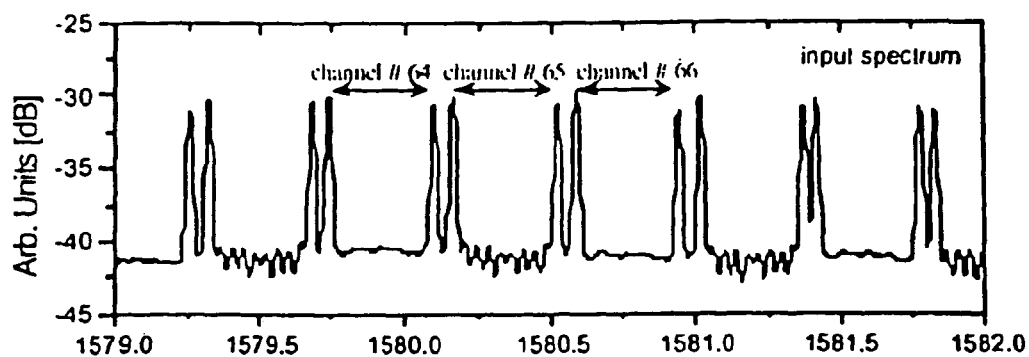
Figure 3D:
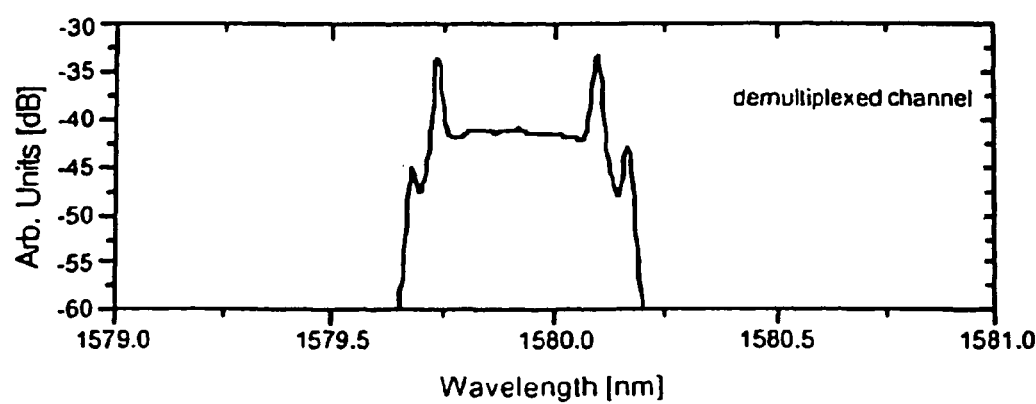
FIG. 3d graphically depicts a demultiplexed channel of the optical signal of FIG. 3c.

FIG. 3c graphically depicts a magnified portion of the spectrum of the input optical signal of FIG. 3a. FIG. 3d graphically depicts a demultiplexed (post-filtered) channel of the optical signal of FIG. 3c. As evident from a comparison of FIG. 3c to FIG. 3d, the combined pre-filtering and post-filtering of the present invention successfully increases the capacity and spectral efficiency of the optical transmissions system 100.

Figure 4:
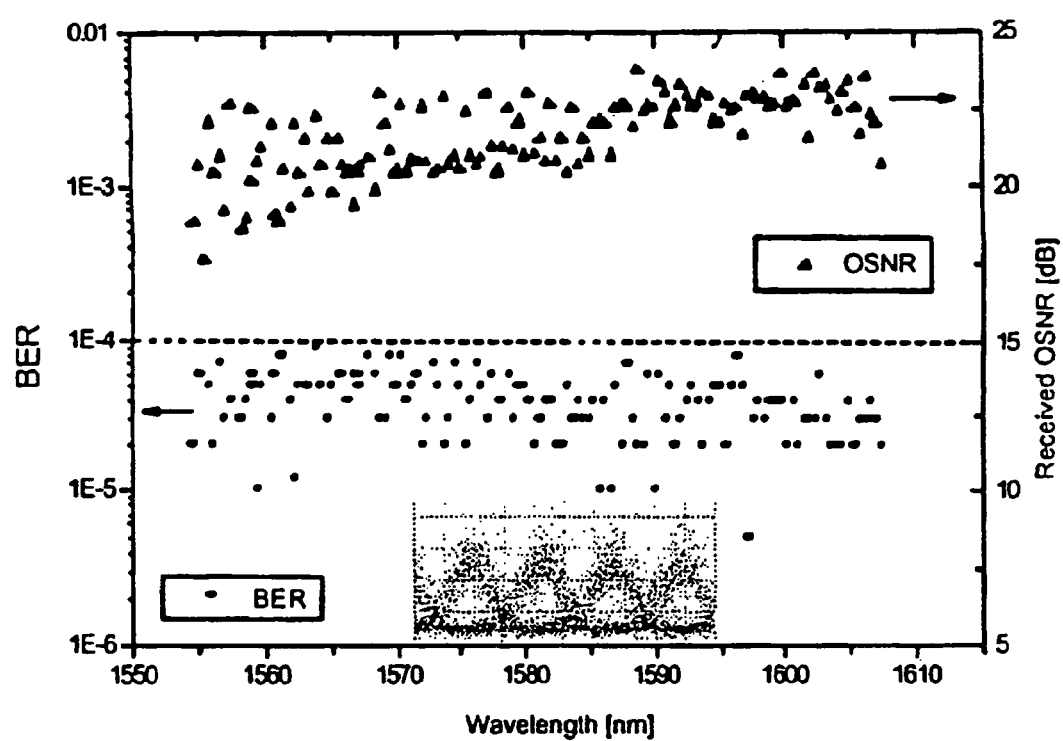
FIG. 4 depicts the received optical signal-to-noise ratio and bit-error-rate for all 128 channels of the optical transmission system of FIG. 1.

To achieve a BER=$10^{-9}$ for the 50 GHz channel spacing and strong filtering of the optical channels in accordance with the present invention, a 26.5 dB OSNR is required in back-to-back configuration. This represents a penalty of approximately 3 dB over a similar system implementing 100 GHz channel spacing (0.4 bits/s/Hz spectral efficiency) without strong optical filtering. FIG. 4 depicts the received OSNR and BER for all 128 channels of the optical transmission system setup of FIG. 1. As can be seen in FIG. 4, most of the channels (116 out of 128) have a BER after transmission equal to or better than $6\times10^{-5}$. This level of BER enables operation at a corrected BER=$10^{-16}$ or better by means of correction by, for example standard Reed-Solomon FEC with 7% overhead. The worst channel has a BER=$9\times10^{-5}$ which enables operation at a corrected BER of approximately $10^{-14}$. The measured transmission penalties of the present invention were small, in the range of 0 to 1.5 dB after transmission of 1280 km.

The inventors have demonstrated all-Raman single-band transmission of 5.12 Tb/s (128×42.7 Gb/s @ 50 GHz) over 1280 km of commercially available SSMF with a spectral efficiency of 0.8 bits/s/Hz for a total capacity of 6.55 Pb/s·km. This record capacity at such a high spectral efficiency was achieved by means of strong pre-filtering and post-filtering of a CS-RZ signal using readily available components typically associated with transmission systems having a 10 Gb/s bit rate.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for increasing the capacity and spectral efficiency of an optical transmission system, comprising:
   orthogonally polarizing at least two banks of channels;
   coupling the at least two banks of channels by an interleaver;
   pre-filtering optical pulses utilizing the interleaver having a narrow bandwidth substantially proportional to the bit rate of the transmission system prior to propagating said optical pulses along a transmission fiber; and
   post-filtering said optical pulses utilizing at least one slicer having a narrow bandwidth substantially proportional to the bit rate of the transmission system after propagation of said optical pulses along said transmission fiber.

2. The method of claim 1, wherein said optical pulses are carrier-suppressed-return-to-zero optical pulses.

3. The method of claim 1, wherein said optical transmission system has a per channel bit rate of substantially 40 Gb/s.

4. The method of claim 3, wherein the bandwidth of said pre-filtering is 50 GHz.

5. The method of claim 3, wherein the bandwidth of said post-filtering is 41 GHz.

6. The method of claim 1, further comprising amplifying said pre-filtered optical pulses prior to said post-filtering.

7. An optical transmission system, comprising:
   at least two light sources, for providing light at a plurality of wavelengths; at least two transmitters, for generating optical pulses from said at least two light sources;
   an interleaver, for coupling the generated optical pulses from at least two light sources and for pre-filtering said optical pulses utilizing a narrow bandwidth substantially proportional to the bit rate of the transmission system prior to propagating said optical pulses along a transmission fiber;
   at least one slicer, for post-filtering said optical pulses utilizing a narrow bandwidth substantially proportional to the bit rate of the transmission system after propagation of said optical pulses along said transmission fiber; and
   a receiver, for receiving said filtered optical pulses.

8. The optical transmission system of claim 7, wherein said optical pulses are carrier-suppressed-return-to-zero optical pulses.

9. The optical transmission system of claim 7, wherein said optical transmission system has a per channel bit rate of substantially 40 Gb/s.

10. The optical transmission system of claim 9, wherein the bandwidth of said at least one first filter is 50 GHz.

11. The optical transmission system of claim 9, wherein the bandwidth of said at least one second filter is 41 GHz.

12. The optical transmission system of claim 7, wherein the bandwidth of said receiver is less than sixty percent (60%) of the bit rate of the transmission system.

13. The optical transmission system of claim 7, wherein said at least one light source comprises at least one laser.

14. The optical transmission system of claim 13, wherein said at least one laser comprises 128 lasers spaced by 50 GHz.

15. The optical transmission system of claim 14, wherein said lasers are grouped into two banks of 64 sources, wherein each bank is multiplexed by at least one respective multiplexer and modulated by at least one respective transmitter prior to being combined and filtered by said interleaver.

16. The optical transmission system of claim 7, wherein each of said at least one transmitter comprises a carver modulator followed by a data modulator.

17. The optical transmission system of claim 7, further comprising an amplifier, for amplifying said pre-filtered optical pulses prior to said post-filtering.

18. The optical transmission system of claim 17, wherein said amplifier comprises a booster amplifier.

* * * * *